(12) United States Patent
Blanchard et al.

(10) Patent No.: US 9,694,732 B2
(45) Date of Patent: Jul. 4, 2017

(54) DOUBLE FLANGED OFF-SET VALVE ASSEMBLY

(71) Applicant: Marshall Excelsior Company, Marshall, MI (US)

(72) Inventors: Frederick W. Blanchard, Battle Creek, MI (US); Alex L. Hoffman, Bellevue, MI (US)

(73) Assignee: MARSHALL EXCELSIOR CO., Marshall, MI (US)

( * ) Notice: Subject to any disclaimer, the term of this patent is extended or adjusted under 35 U.S.C. 154(b) by 0 days.

(21) Appl. No.: 14/207,783

(22) Filed: Mar. 13, 2014

(65) Prior Publication Data

US 2014/0261801 A1    Sep. 18, 2014

Related U.S. Application Data

(60) Provisional application No. 61/785,606, filed on Mar. 14, 2013.

(51) Int. Cl.
   *B60P 3/22* (2006.01)
   *F16K 27/02* (2006.01)

(52) U.S. Cl.
   CPC ............. *B60P 3/225* (2013.01); *F16K 27/02* (2013.01); *Y10T 137/86035* (2015.04)

(58) Field of Classification Search
   CPC ........ B60K 15/00; B60P 3/225; B60P 3/2245; F16K 27/07; F16K 27/02; Y10T 137/86035
   USPC .......................... 251/144, 319, 320, 321, 366; 137/565.17, 343, 899; 138/94, 177; 285/410, 412, 416, 405
   See application file for complete search history.

(56) References Cited

U.S. PATENT DOCUMENTS

| | | | | |
|---|---|---|---|---|
| 2,164,039 A | * | 6/1939 | Meyer et al. | 137/326 |
| 2,469,109 A | * | 5/1949 | Goecke | 137/375 |
| 2,512,877 A | * | 6/1950 | Rike | 210/172.2 |
| 2,818,636 A | * | 1/1958 | Fentress et al. | 29/454 |
| 2,846,013 A | * | 8/1958 | Davis | 166/97.5 |
| 3,259,405 A | * | 7/1966 | Heller | 285/226 |
| 3,656,710 A | * | 4/1972 | Shaw | B65D 88/54 251/144 |
| 4,280,679 A | * | 7/1981 | Shaw | 251/144 |
| 4,457,486 A | * | 7/1984 | DeFrees | 251/58 |
| 4,565,210 A | * | 1/1986 | Heine et al. | 137/219 |
| 4,590,959 A | * | 5/1986 | Fort | 137/315.35 |
| 5,033,495 A | * | 7/1991 | Monauni et al. | 137/74 |
| 5,699,835 A | * | 12/1997 | Nakagawa | F16L 9/133 138/177 |
| 5,810,327 A | * | 9/1998 | Lutz | 251/75 |

(Continued)

OTHER PUBLICATIONS

LP-Gas Equipment; "Bobtail Pressure Drop" product information manual. Mar. 19, 2010; 4 pages; St. Paul, Minnesota, USA.

(Continued)

*Primary Examiner* — John K Fristoe, Jr.
*Assistant Examiner* — Andrew J Rost
(74) *Attorney, Agent, or Firm* — Howard & Howard Attorneys PLLC

(57) ABSTRACT

A valve assembly for mounting a pump to a storage tank of a vehicle includes an upper flange, a lower flange, and a wall extending axially between the upper flange and the lower flange, the lower flange being offset by the wall relative to the upper flange to facilitate installation of the pump on the vehicle.

19 Claims, 6 Drawing Sheets

(56) References Cited

U.S. PATENT DOCUMENTS

| | | | |
|---|---|---|---|
| 6,244,288 B1 * | 6/2001 | Pettesch | 137/68.14 |
| 6,772,652 B2 * | 8/2004 | Cronimus | 73/866.5 |
| 7,717,473 B1 * | 5/2010 | Zhang et al. | 285/121.7 |
| 8,088,339 B2 * | 1/2012 | Glad et al. | 422/310 |
| 2013/0181153 A1 | 7/2013 | Blanchard et al. | |

OTHER PUBLICATIONS

Marshall Excelsior Company; "Excelerator™" Series ME990-3F-24, ME990-3DF and ME990-3DFM 3" Flanged Internal Valve installation and operating manual. Jan. 9, 2012, 12 pages; Marshall, Michigan USA.

* cited by examiner

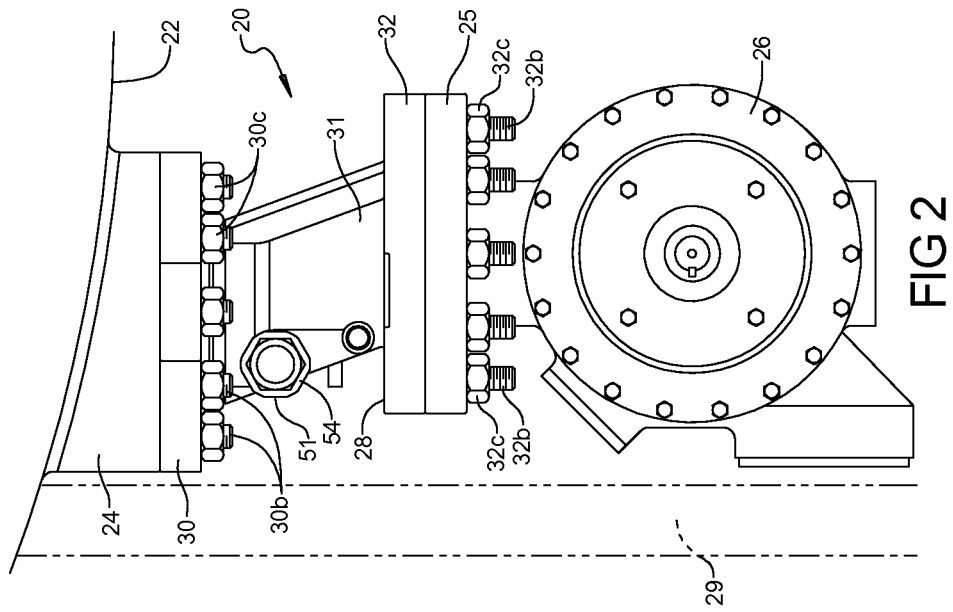
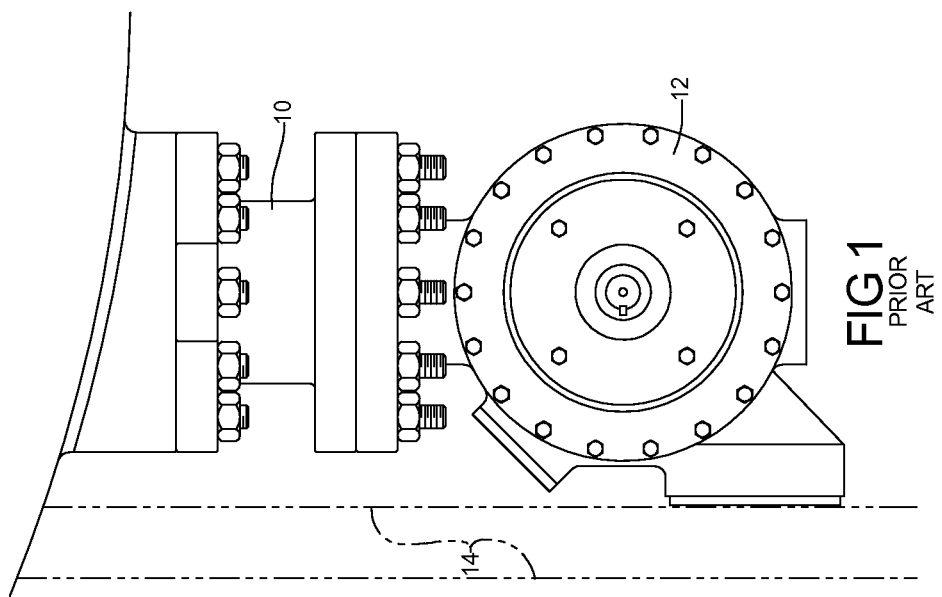
FIG 2
FIG 1
PRIOR ART

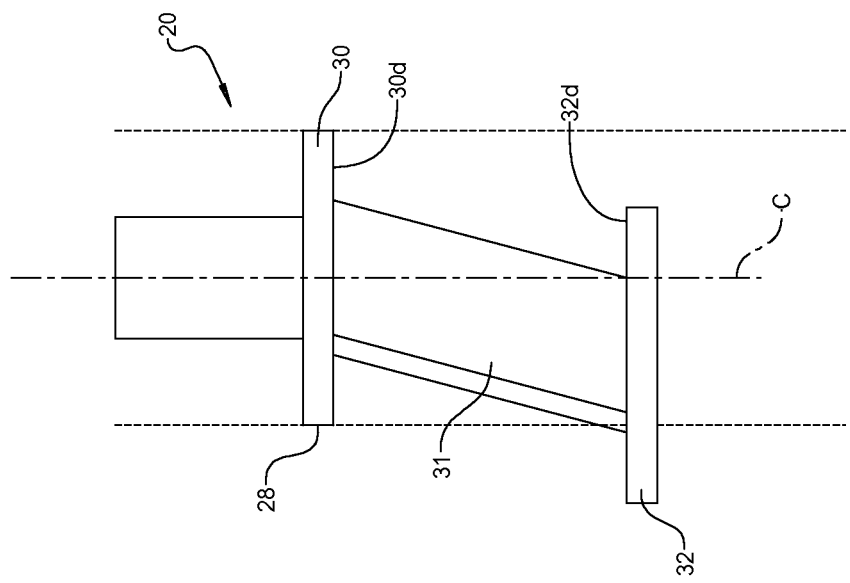
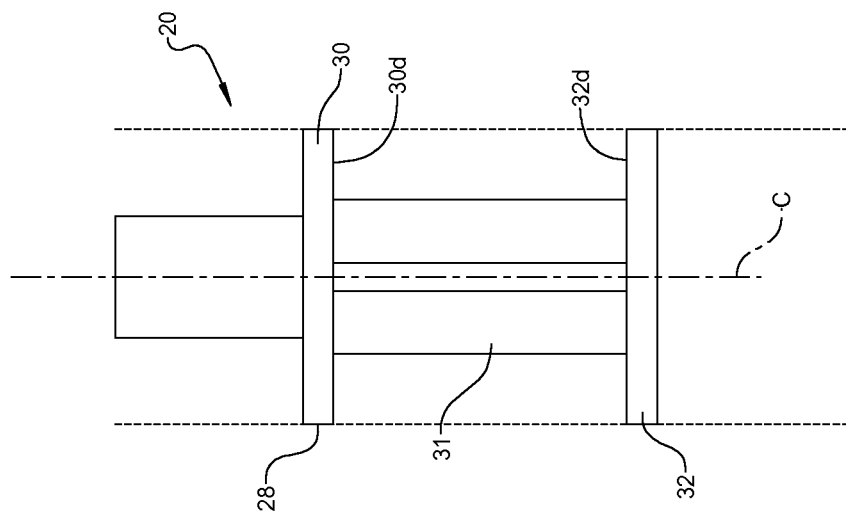

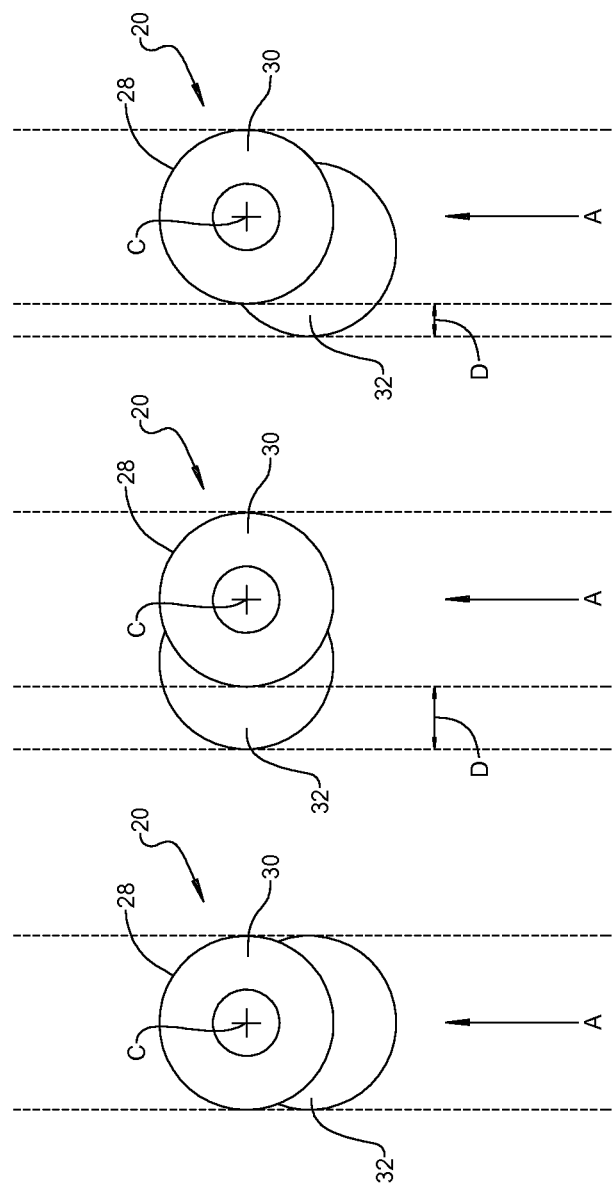

DOUBLE FLANGED OFF-SET VALVE ASSEMBLY

CROSS-REFERENCE TO RELATED APPLICATION(S)

The present invention claims priority to and the benefit of U.S. Provisional Patent Application Ser. No. 61/785,606, filed Mar. 14, 2013, which is hereby incorporated by reference in its entirety.

BACKGROUND OF THE INVENTION

1. Field of the Invention

The present invention relates generally to valve assemblies and, more particularly to, a valve assembly including dual flanges offset relative to each other.

2. Description of the Related Art

Valve assemblies, such as those for transferring fluid, are known in the art. One type of valve assembly is an internal valve. Internal valves are often mounted to a sump of a storage tank on a vehicle such as a bobtail truck or other types of transport trucks. Beneath the internal valve, a pump is often attached to convey liquid out of the storage tank. See, for example, the arrangement of the internal valve 10 and pump 12 in FIG. 1. As shown, the pump 12 is attached directly beneath the internal valve 10 vertically in line with the internal valve 10.

One disadvantage of these pumps is that they are often large and cumbersome and, due to space constraints beneath the storage tank, often interfere with parts of a chassis of the truck. As a result, the pump 12 installation requires straddling across a rail 14 of the chassis of the truck. When a width between parallel rails on trucks is like that shown in FIG. 1, pump installation is difficult. As a result, there is a need in the art to provide a new valve assembly that addresses these space constraints to facilitate installations.

SUMMARY OF THE INVENTION

Accordingly, the present invention provides a valve assembly for mounting a pump to a storage tank on a vehicle. The valve assembly includes a valve body having an upper flange, a lower flange, and a wall extending axially between the upper flange and the lower flange. The lower flange is offset by the wall relative to the upper flange to facilitate installation of the pump on the vehicle.

One advantage of the present invention is that a new valve assembly is provided between a storage tank mounted to a vehicle and a pump. Another advantage of the present invention is that the valve assembly includes dual flanges that are offset relative to each other and allow positioning of the pump away from a rail of the vehicle, the rail no longer interfering with the pump, in contrast to the prior art installations. Yet another advantage of the present invention is that the valve assembly provides flexibility to adjust the amount of offset, resulting in installations of the valve assembly to accommodate variations in different chassis sizes, shapes, styles, etc. of the particular vehicle to which the storage tank is mounted.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 1 is a front view of a prior art arrangement of an internal valve and a pump mounted on a bobtail truck.

FIG. 2 is a front view of a valve assembly, according to the present invention, illustrating the valve assembly and a pump mounted on a bobtail truck.

FIGS. 3 and 3A are diagrammatic views illustrating a position of the valve assembly of FIG. 2 arranged vertically in-line from a horizontal point of view.

FIGS. 4 and 4A are diagrammatic views illustrating a position of the valve assembly of FIG. 2 arranged vertically offset with respect to the same horizontal point of view of FIGS. 3 and 3A.

FIG. 4B is a diagrammatic view illustrating a position of the valve assembly of FIG. 2 arranged partially vertically offset with respect to the same horizontal point of view of FIG. 4A.

DESCRIPTION OF THE PREFERRED EMBODIMENT(S)

Figure 5:
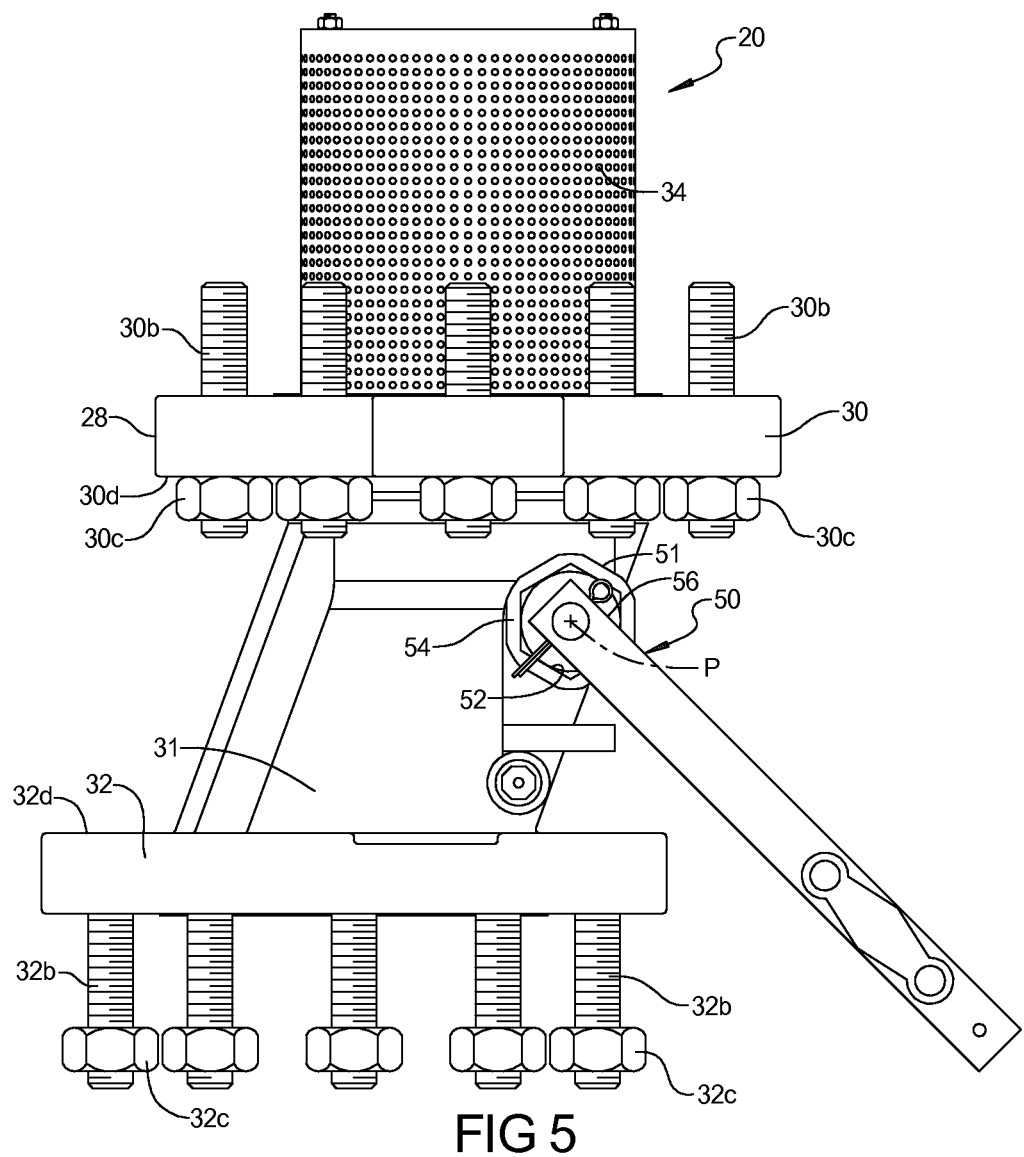
FIG. 5 is a front view of the valve assembly, according to one embodiment of the present invention.

Referring to the Figures and in particular FIGS. 2 through 6, wherein like numerals indicate like or corresponding parts throughout the several views, one embodiment of a valve assembly 20, according to the present invention, is shown. The valve assembly 20 is utilized to manipulate fluid transfer. The valve assembly 20 is of an internal valve type. It should be appreciated that the fluid handled by the valve assembly 20 can be liquid petroleum gas (LP-Gas), anhydrous ammonia ($NH_3$) or any other suitable fluid.

Referring to FIG. 2, the valve assembly 20 is typically mounted to a storage tank 22 storing the fluid. In the embodiment illustrated, the valve assembly 20 is mounted to an outlet sump 24 integral with the storage tank 22 (here the storage tank 22 is shown mounted on a vehicle such as a transport truck, in particular a bobtail truck). The sump 24 is a downwardly extending neck that surrounds an outlet of the storage tank 22. The valve assembly 20 is configured to be mounted to the sump 24 to facilitate withdrawal of fluid from the storage tank 22. The valve assembly 20 is configured for receiving a pump 26 for withdrawing fluid from the storage tank 22. The pump 26 is mounted beneath and to the valve assembly 20. The pump 26 is of a liquid pump type for withdrawing fluid from the storage tank 22 through the valve assembly 20. It should be appreciated that the valve assembly 20 is used for mounting the pump 26 to the storage tank 22 on the vehicle.

The valve assembly 20 includes a valve body 28 having an upper flange 30 and a lower flange 32. The valve body 28 includes a wall 31 extending between the flanges 30, 32. The upper flange 30 is generally circular in shape. The upper flange 30 is sized to mount to the sump 24. The upper flange 30 defines a plurality of circumferentially spaced throughbores 30a for receiving a plurality of threaded fasteners 30b. In the embodiment illustrated, the upper flange 30 has eight (8) throughbores 30a circumferentially spaced thereabout. The threaded fasteners 30b are first threaded into corresponding threaded bores (not shown) in the sump 24. The upper flange 30 is then fitted to the sump 24 by positioning the throughbores 30a over the threaded fasteners 30b and securing nuts 30c onto the threaded fasteners 30b as illustrated in FIG. 2. The throughbores 30a are internally smooth and include bushings (not shown) disposed therein for slidably receiving the threaded shafts 30b. In some embodiments, a seal or gasket (not shown) is first positioned between the sump 24 and the upper flange 30.

The lower flange 32 is spaced axially from the upper flange 30. The lower flange 32 is generally parallel to upper flange 30. The lower flange 32 is generally circular in shape. The lower flange 32 defines a plurality of circumferentially spaced and threaded bores 32a (FIG. 6) for receiving a plurality of threaded fasteners 32b. In the embodiment illustrated, the lower flange 32 has eight (8) threaded bores 32a spaced circumferentially thereabout. Once the upper flange 30 is attached to the sump 24, the pump 26 is attached to the lower flange 32. The threaded fasteners 32b are threaded into the threaded bores 32a of the lower flange 32. Smooth throughbores (not shown) of a pump flange 25 of the pump 26 are positioned over the threaded fasteners 32b. The pump flange 25 is held in place by nuts 32c fastened to the threaded fasteners 32b.

The lower flange 32 is vertically or radially offset from upper flange 30. As a result, an angled portion of the wall 31 is oriented at an acute angle with respect to the lower flange 32. In some embodiments, the acute angle is greater than 0 degrees, but less than 90 degrees, more preferably from about 10 degrees to about 80 degrees, and most preferably from about 40 degrees to about 75 degrees. The axial distance between an upper surface 30d of the upper flange 30 and an upper surface 32d of the lower flange 32 is from about 4 inches to about 24 inches, more preferably from about 4 inches to about 20 inches, and most preferably from about 4 inches to about 12 inches.

In the embodiment illustrated, the lower flange 32 has a maximum offset from about 0.5 inches to about 4.0 inches relative to the upper flange 30. More preferably, the lower flange 32 has a maximum offset from about 1.0 inches to about 3.0 inches, and in the particular embodiment illustrated, the lower flange 32 has a maximum offset from about 2.0 inches relative to the upper flange 30.

It should be appreciated that the offset is based on the particular horizontal point of view taken of the valve assembly 20. For instance, referring to FIGS. 3 and 4, the same horizontal point of view is shown for viewing the valve assembly 20, however, the valve assembly 20 is shown in different rotational positions about a central axis C. As a result, the offset is only visible in FIG. 4 from the particular point of view shown. In FIG. 3, the valve assembly 20 is rotated 90 degrees with respect to FIG. 4 so that the offset is positioned to be in line with the point of view, which makes it unperceivable. FIGS. 3A and 4A show overhead views of this same principle with the horizontal point of view indicated by an arrow A.

During installation, a user can control the amount of offset to apply. For instance, in one embodiment, the offset is reduced by 10% to 50% by rotating the valve assembly 20 one throughbore 30a in either direction when attaching the valve assembly 20 to the sump 24. In some embodiments, when the valve assembly 20 is rotated by one throughbore 30a (out of eight) in either direction, the offset is reduced from 2 inches to 1.25 inches with respect to the same horizontal point of view. The variation in offset (shown by double arrows D) in FIGS. 4A and 4B illustrate this concept. In FIG. 4B, the perceived offset is less than the perceived offset in FIG. 4A due to the amount of rotation of the valve assembly 20 about the central axis C. It should be appreciated that the perceived offset is based on the point of view represented by the arrow A in FIGS. 4A and 4B.

With the flexibility to adjust the offset, installations of the valve assembly 20 can be made easier to accommodate variations in different chassis sizes, shapes, styles, etc. of the particular transport truck to which the storage tank 22 is mounted. As illustrated in FIG. 2, by positioning the offset away from a rail 29 of the vehicle, the rail 29 no longer interferes with the pump 26, in contrast to the prior art installation shown in FIG. 1.

Figure 6:
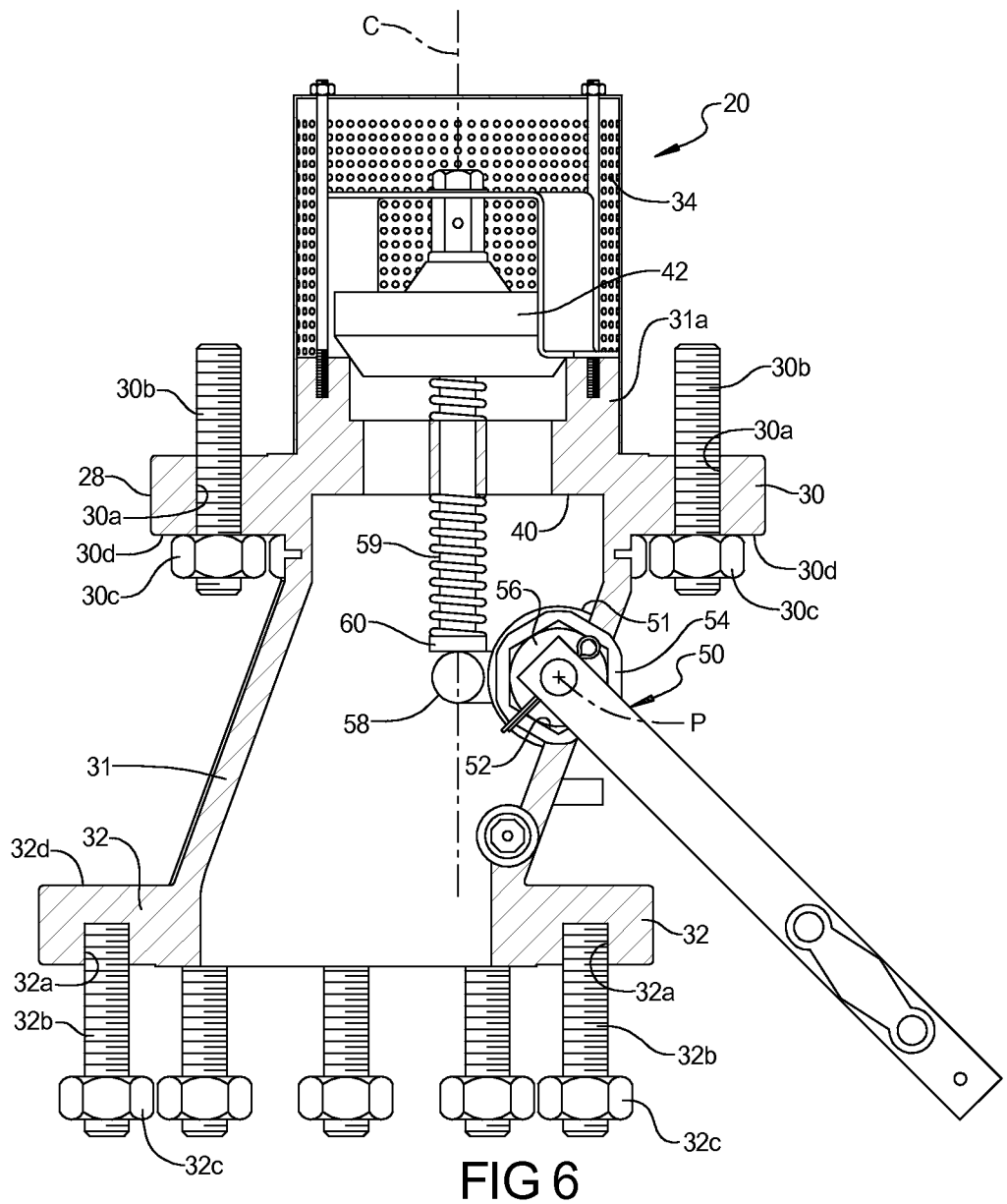
FIG. 6 is a partial sectional view of the valve assembly of FIG. 5.

Referring to FIGS. 5 and 6, the valve assembly 20 includes a mesh cage 34 disposed over and covering an upper portion 31a of the wall 31 of the valve body 28 that extends upwardly from upper flange 30. The mesh cage 34 is configured for installation inside the storage tank 22. The wall 31 defines a cavity 40. The valve assembly 20 includes a main valve member 42 partially disposed in the cavity 40. Generally, the main valve member 42 controls fluid flow through the valve assembly 20 between the tank 22 and the pump 26. The main valve member 42 is moveable between an open position and a closed position. In the open position, the main valve member 42 allows fluid flow through the valve assembly 20. In the closed position, the main valve member 42 prevents fluid flow through the valve assembly 20. Generally, the main valve member 42 moves along the central axis C. The main valve member 42 may be known in the art as a poppet valve. Further details of the main valve member 42, its operation, and the remaining internal components of the valve assembly 20 are disclosed in U.S. patent application Ser. No. 13/744,599, entitled "Valve Assembly and Method", the disclosure of which is hereby incorporated by reference.

The valve assembly 20 also includes an actuator, generally indicated at 50, extending through a gland port 51 integral with the wall 31. The actuator 50 moves the main valve member 42 between the open position and the closed position. The gland port 51 defines a bore 52. In one embodiment, the actuator 50 includes a shaft 56 extending through the bore 52 and into the cavity 40 of the valve body 28. The shaft 56 is rotatable in the bore 52 about a pivot axis P between a plurality of operational positions. It should be appreciated that the shaft 56 is secured in the bore 52 by a fastener 54 such as a nut threadably engaging the bore 52.

The actuator 50, which may include a pneumatic or rotary type actuator, includes a cam 58 coupled to the shaft 56 for engaging a pilot valve member 59 coupled to the main valve member 42. The pilot valve member 59 includes a pilot valve stem 60 and the cam 58 engages the pilot valve stem 60. The pilot valve member 59 configuration is conventional for actuating the main valve member 42 of internal valves, as disclosed in U.S. patent application Ser. No. 13/744,599, entitled "Valve Assembly and Method", the disclosure of which is hereby incorporated by reference.

Figure 7:
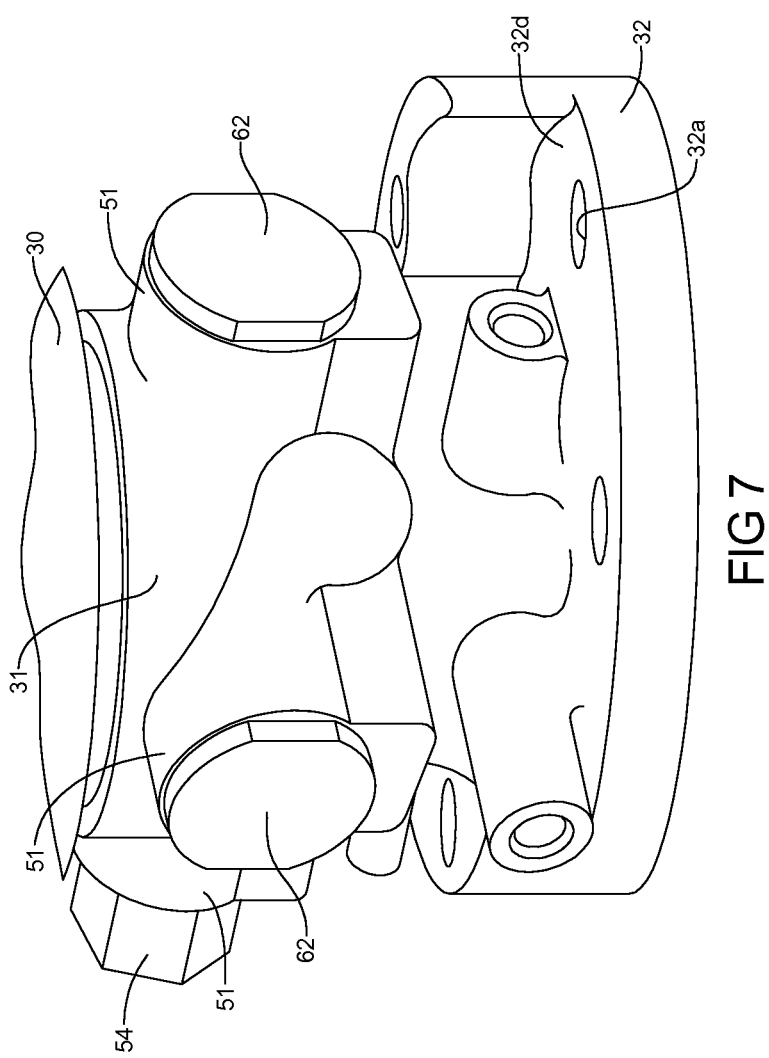
FIG. 7 is a partial perspective view of the valve assembly of FIG. 5.

Referring to FIG. 7, the valve assembly 20 further includes a plurality of the gland ports 51 defining bores 52 provided for selectively receiving the shaft 56 of the actuator 50. In one embodiment, three gland ports 51 are spaced circumferentially about the wall 31 of the valve assembly 20. The gland ports 51 may be provided at 90 degree intervals about the valve assembly 20. The spacing of the gland ports 51 may be larger or smaller. With the multiple gland ports 51, flexibility with installation is increased as compared to conventional internal valves. For instance, if the valve assembly 20 is installed in one rotational position relative to the sump 24, a first of the gland ports 51 can be used to receive the shaft 56 of the actuator 50, while the other two gland ports 51 are plugged with threaded plugs 62. In some embodiments, when the same valve assembly 20 is rotated to a different rotational position, a second or third of the gland ports 51 could be used with the other gland ports 51 plugged with the threaded plugs 62 as illustrated in FIG. 7.

Embodiments of the present invention have been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A valve assembly for mounting a pump to a storage tank of a vehicle, said valve assembly comprising:
    a valve; and
    a valve body coupled to said valve and being made of a metal material, said valve body having an upper flange, a lower flange being parallel to said upper flange, and a cylindrical wall extending axially and linearly at an angle between and non-rotatably fixed to said upper flange and said lower flange, said wall having an angled portion oriented at an acute angle with respect to said lower flange, said upper flange, said wall, and said lower flange being integral, unitary, and one-piece, said lower flange being offset by said wall relative to said upper flange to facilitate installation of the pump on the vehicle, said upper flange including a plurality of circumferentially spaced through bores to reduce the offset based on a particular horizontal point of view of said valve assembly by rotating the valve body in either direction when attaching the valve body to an outlet sump of the storage tank.

2. A valve assembly as set forth in claim 1 wherein said lower flange is vertically offset from said upper flange.

3. A valve assembly as set forth in claim 1 wherein said acute angle is greater than 0 degrees and less than 90 degrees.

4. A valve assembly as set forth in claim 1 wherein said acute angle is about 10 degrees to about 80 degrees.

5. A valve assembly as set forth in claim 1 wherein said acute angle is about 40 degrees to about 75 degrees.

6. A valve assembly as set forth in claim 1 wherein said upper flange has an upper surface and said lower flange has an upper surface.

7. A valve assembly as set forth in claim 6 wherein a distance between said upper surface of said upper flange and said upper surface of said lower flange is from about 4 inches to about 24 inches.

8. A valve assembly as set forth in claim 6 wherein a distance between said upper surface of said upper flange and said upper surface of said lower flange is from about 4 inches to about 20 inches.

9. A valve assembly as set forth in claim 6 wherein a distance between said upper surface of said upper flange and said upper surface of said lower flange is from about 4 inches to about 12 inches.

10. A valve assembly as set forth in claim 1 including a plurality of fasteners extending through said through bores and adapted to connect said upper flange to the storage tank.

11. A valve assembly as set forth in claim 1 wherein said lower flange includes a plurality of circumferentially spaced threaded bores.

12. A valve assembly as set forth in claim 11 including a plurality of fasteners threadably engaging said threaded bores and adapted to connect said lower flange to the pump.

13. A valve assembly comprising:
    a valve body being made of a metal material and having an upper flange adapted to mount to a storage tank of a vehicle, a lower flange adapted to mount to a pump and being parallel to said upper flange, and a cylindrical wall extending axially and linearly at an angle between and non-rotatably fixed to said upper flange and said lower flange and defining a cavity therein, said upper flange, said wall, and said lower flange being integral, unitary, and one-piece, said wall having an angled portion oriented at an acute angle with respect to said lower flange such that said lower flange is offset radially relative to said upper flange, said upper flange including a plurality of circumferentially spaced through bores to reduce the offset based on a particular horizontal point of view of said valve assembly by rotating the valve body in either direction when attaching the valve body to an outlet sump of the storage tank;
    a mesh cage disposed over an upper portion of said valve body for installation inside the storage tank;
    a main valve member partially disposed in said cavity to control fluid flow through said valve body between the storage tank and the pump, said main valve member being moveable between an open position and a closed position along a central axis C; and
    an actuator extending through said wall to move said main valve member between the open position and the closed position, said actuator including a shaft extending through said wall and into said cavity, said shaft being rotatable about a pivot axis P between a plurality of operational positions.

14. A valve assembly as set forth in claim 13 wherein said acute angle is greater than 0 degrees and less than 90 degrees.

15. A valve assembly as set forth in claim 13 wherein said acute angle is about 10 degrees to about 80 degrees.

16. A valve assembly as set forth in claim 13 wherein said acute angle is about 40 degrees to about 75 degrees.

17. A valve assembly as set forth in claim 13 wherein a distance between said upper surface of said upper flange and said upper surface of said lower flange is from about 4 inches to about 24 inches.

18. A valve assembly as set forth in claim 13 wherein a distance between said upper surface of said upper flange and said upper surface of said lower flange is from about 4 inches to about 20 inches.

19. A valve assembly as set forth in claim 13 wherein a distance between said upper surface of said upper flange and said upper surface of said lower flange is from about 4 inches to about 12 inches.

* * * * *